July 24, 1956  H. C. GERRISH  2,756,128
APPARATUS FOR DETERMINATION OF FUEL-AIR RATIO OF GAS MIXTURES
Filed Aug. 17, 1951  2 Sheets-Sheet 1
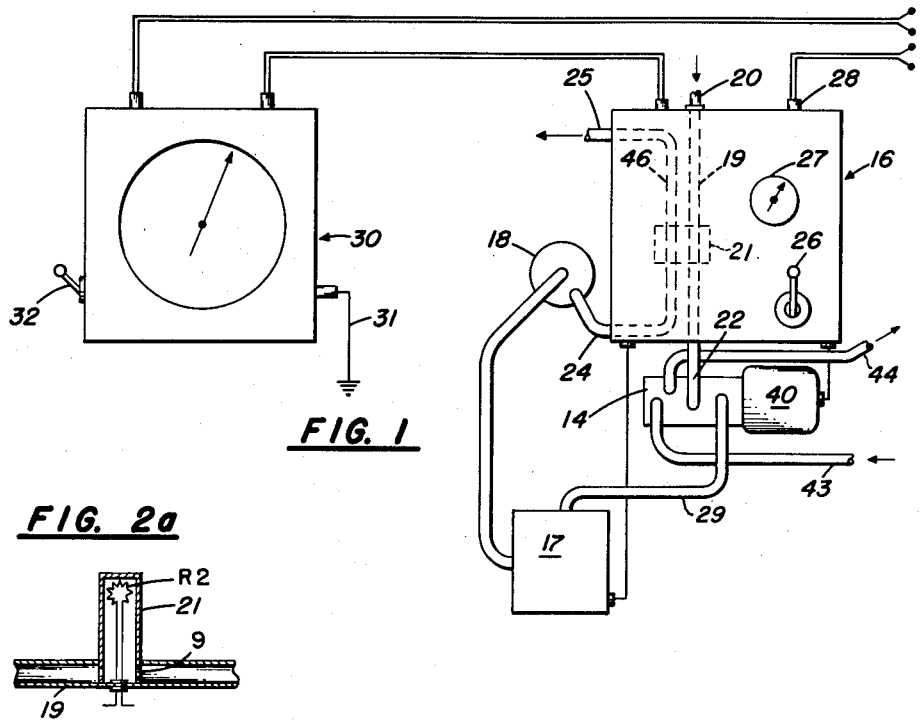
FIG. 1
FIG. 2a
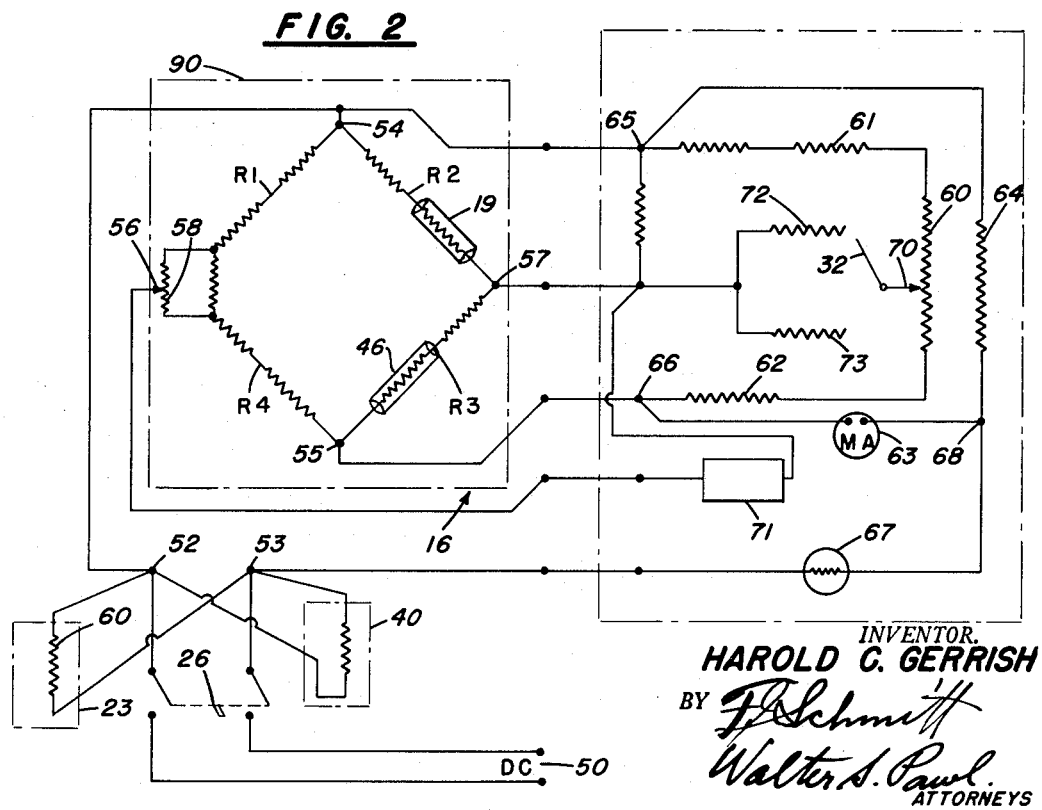
FIG. 2
INVENTOR.
HAROLD C. GERRISH
BY
ATTORNEYS July 24, 1956 H. C. GERRISH 2,756,128
APPARATUS FOR DETERMINATION OF FUEL-AIR RATIO OF GAS MIXTURES
Filed Aug. 17, 1951 2 Sheets-Sheet 2

INVENTOR.
HAROLD C. GERRISH
BY
ATTORNEYS

United States Patent Office 2,756,128
Patented July 24, 1956

2,756,128

APPARATUS FOR DETERMINATION OF FUEL-AIR RATIO OF GAS MIXTURES

Harold C. Gerrish, Rocky River, Ohio

Application August 17, 1951, Serial No. 242,395

2 Claims. (Cl. 23—254)

(Granted under Title 35, U. S. Code (1952), sec. 266)

This invention relates generally to gas mixture analyzers with special application for use with multi-cylinder internal combustion engines, jet engines, bombs, furnaces and the like to determination of the continuous fuel-air ratio of the fuel mixture supply of internal combustion engines.

Various instruments such as gasometers and venturi meters have heretofore been in use for the continuous determination of the fuel-air ratios of gases, supplied to internal combustion engines. Known deficiencies of these instruments include the failure thereof to indicate correctly the fuel-air ratio at different atmospheric levels or conditions, the requirement for periodic replacement of chemicals, where chemical oxidizers are used, with attendant increase in operating costs, and lack of adequate accuracy in meter reading.

Accordingly, a main object of the invention is to insure complete oxidation of a sample quantity of test exhaust gas without the use of chemicals. Another object is to adjust the flow of air to the oxidizer and bridge so as to obtain meter readings independent of air density and consequently, engine altitude.

Additional objects include pump means insuring accurate volumes of air and fuel intake to the oxidizer, the elimination of chemical oxidizers and, in general, simplification of the system to reduce replacements and number of parts.

Other objects will appear on consideration of the following description of the apparatus and of the accompanying drawings in which:

Fig. 1 is a view of the associated elements and connections of the apparatus;

Fig. 2 is a view of the wiring diagram as applied to the bridge;

Fig. 2a is a detail view of the diffuser cell;

Briefly stated, the invention contemplates the measurement of the fuel-air ratio of supply to an internal combustion engine measuring carbon dioxide content of the oxidized engine exhaust in terms of fuel-air ratios, completely and continuously oxidizing the carbon carrying constituents of a sample of the exahust, and employing the same air fraction used as a reference gas in an electric bridge as the constituent entering into the exhaust oxidation and the compared arm of the bridge.

Figure 3:
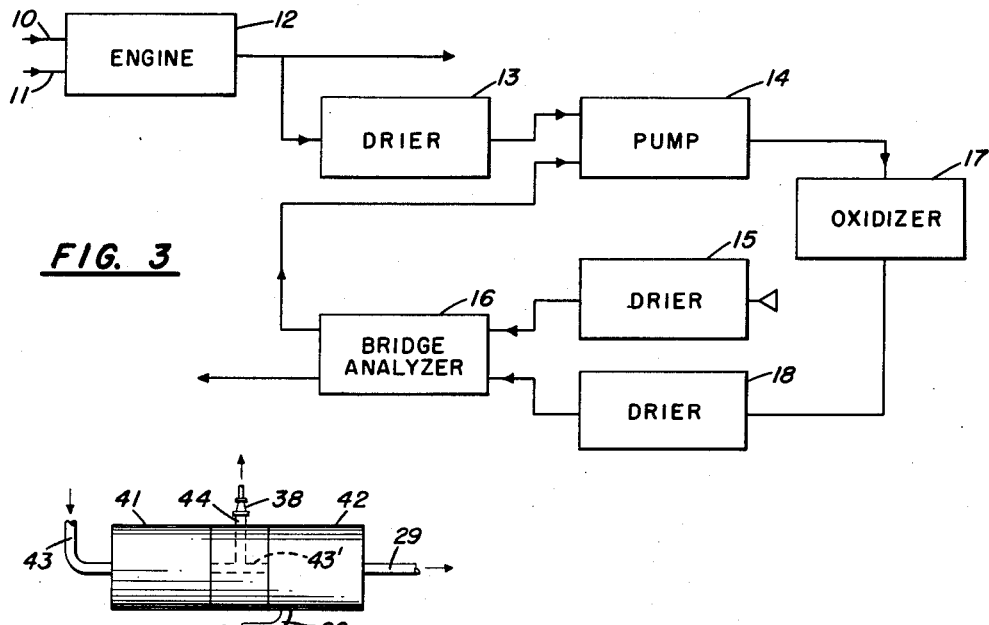
Fig. 3 is a schematic view indicating the gas flow of the system.

Reference is now made to Fig. 3 for a description of the gas apparatus as applied to an internal combustion engine. Gaseous fuel 10 and air 11 are led into the engine 12 and a sample of the exahust passed through a desiccator 13 into a compound gas-metering pump 14. This pump receives also an equal amount of air which previously has passed through a desiccator 15 and in direct association with resistance elements in two arms of bridge analyzer 16.

After passage through the pump, equal volumes of fuel and air are moved into the oxidizer 17 wherein the exhaust carbon is completely oxidized, and through desiccator 18 and the remaining arms of bridge 16 to the atmosphere.

In Fig. 1 is illustrated the actual structural elements employed in the flow system of the apparatus. The analyzer 16 is provided with an air inlet 20 through which atmospheric air is led to analyzer diffuser cells 21 by means of conduit 19. These cells are off-set tubes based on the conduit and containing an electric resistor coil R at the outer tube end and openings 9 at the base for diffusion of air into the tube from the conduit. The resistor coils R including $R_1$, $R_2$, $R_3$ and $R_4$ (Fig. 2) form arms of the analyzer bridge and the resistance thereof varies in accordance with the thermal conductivity of the surrounding gases, there being at least one resistor for air and another resistor for carbon dioxide. Conduit 19 contains the air resistors and conduit 46 the gas resistors. Thus, when oxidized fuel exhaust gas is led by a diffuser 21, the resistance thereof, in comparison with an air surrounded resistor will vary in accord with the percentage of carbon dioxide in the gas in an approximately linear relationship.

The analyzer is provided with eight diffuser tubes 21 for the indicated four resistors R, four for air, from inlet 20 passing to outlet 22, and four for the oxidized exhaust gas from oxidizer 17, entering the analyzer at 24 and leaving at 25. The analyzer bridge switch is indicated at 26 and the zero adjustment at 27. Power is supplied the analyzer from a current source at terminal 28. The bridge outlets are led to the indicator in the form of a potentiometer 30, the casing of which is preferably grounded at 31 to eliminate external parasitic voltage effects. Range shift switch 32 effects a transition in the instrument from low to high range readings.

Figure 4:
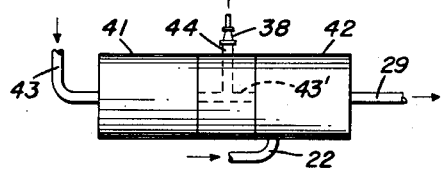
Fig. 4 is a break-down view of the pump of Fig. 1.

The pump mixer unit 14 includes the pump motor 40 and two pumps 41 and 42 (Fig. 4) connected to the motor shaft in alignment with the motor. The pump 41 is designed to draw a set volume of exhaust gases from the engine exhaust through gas inlet 43. Pump 42 is designed to draw a set volume of air which previously has been dried and passed through the bridge analyzer 16 by way of inlet 20. Intermediate the two pumps the exhaust gas conduit 43' is provided with a gas overflow tube 44 to permit escape of gas in excess of the predetermined volume desired for examination. The capacity of pump 41 as regards gas movement is made adjustable in order to obtain an established ratio of gas and air for passage to the oxidizer 23, and for this purpose a replaceable reducing coupling 38, attachable to overflow tube 44, is employed. A 50–50 relationship has been found satisfactory.

The mixed gas and air moves from the pump through conduit 29 to the oxidizer 17. This device is in the form of a ceramic tube enclosed by a heater coil through which tube the gas and air passes, the heat oxidizing the carbon carrying constituents including CO, $CH_4$, and $C_4H_8$, and thus converting these constituents into carbon dioxide, the hydrogen being converted to water and removed by the desiccator. The proportion of air to exhaust is so predetermined that the carbon is completely oxidized under ordinary conditions of operation.

The $CO_2$—$N_2$ and $O_2$ mixture is now dried in the desiccator 18 and then led through the bridge conduit 46, by the attached bridge diffusers 21 and through outlet tube 25 to the atmosphere.

Reference is now made to Fig. 2 for a showing of the electric circuit of the apparatus. A direct current source 50 is provided at a voltage of about 25 to 29, the circuit leading through the manual switch 26 to terminals 52 and 53 where parallel connections are made to the oxidizer 23, the pump motor 40 and the analyzer 16.

The analyzer bridge includes arm resistors $R_1$, $R_2$, $R_3$ and $R_4$ connected in series with inlet junction terminals 54 and 55 and meter terminals 56 and 57. Terminal 56 is preferably a contact slidable on uniform resistor 58, in order to facilitate initial bridge balancing. A potentiometer circuit including potentiometer coil 60 and resistors 61 and 62 is connected to bridge terminals 54 and 55. This circuit includes also the meter 63 connected with resistor 64 in parallel with potentiometer coil 60 at points 65 and 66. Power terminal 53 is connected through ballast tube 67 to the meter branch circuit at point 68 between the resistor 64 and the meter. Power terminal 52 is connected directly to bridge terminal 54.

Potentiometer controls are provided by sliding contact 56 and slide contact 70, movable on uniform resistor coil 60, whereby the bridge current, passing through the potentiometer amplifier 71, may be reduced to the zero point on initial balance.

Bridge resistors $R_1$, $R_2$, $R_3$ and $R_4$ are positioned in diffusers 21, $R_1$ and $R_2$ at tube 19 and $R_3$ and $R_4$ at tube 46 so that the electrical conductivity of these resistors will vary with the nature of gas flowing in the tubes through variation in the thermal conductivity of the ambient gases. Preferably the four bridge resistors are mounted on a thermostated cell block 90 which may be heated if desired by any appropriate means, so that the effects of large changes in ambient temperatures and pressures on the various resistors may be neutralized.

In the use of the apparatus, the analyzer is first adjusted so that the potentiometer needle is balanced at the median point of the scale, the zero adjustment knob 27 being employed for this purpose, with power switch 26 closed. During this adjustment, the fuel inlet tube 43 is disconnected from the engine exhaust so as to pass air, the bridge tubes 19 and 46 both being air filled.

The inlet tube 43 is then reconnected to the exhaust and the gas flow continued for about thirty minutes in order for the instrument to attain operating temperatures, an unobstructed gas flow of about 500 cubic centimeters per minute being required for satisfactory operation. Switches 26 and 32 are closed during this warning period.

Figure 6:
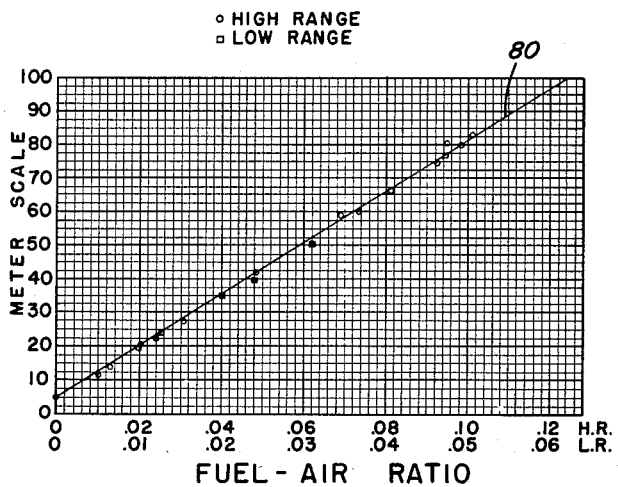
Fig. 6 is a curve indicating relationship between the fuel-air ratio and the meter scale.
Figure 5:
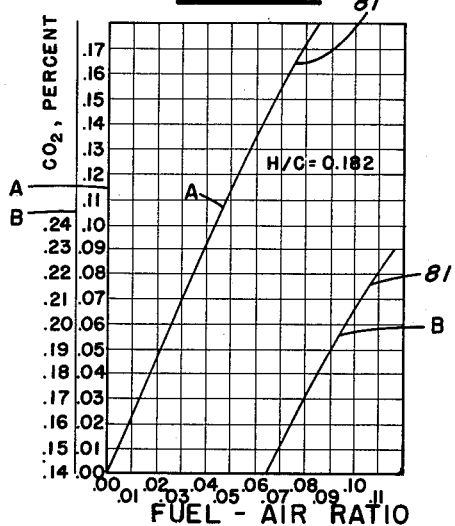
Fig. 5 is a curve indicating relationship between fuel-air ratio and carbon dioxide content of the oxidized exhaust for a given value of hydrogen and carbon content in the engine fuel.

When the apparatus is in heat equilibrium, the test gas is applied at inlet 43 and the potentiometer will, on proper calibration, give an indication which on reference to the curve 80 of Fig. 6 will give the fuel-air ratio of the engine mixture. Calibration is secured by passing the sample exhaust gas through heated copper oxide and determining the carbon dioxide formation by usual chemical methods. Then, as described in my Patent No. 2,298,288, since the fuel-air ratio is a direct variable function of the carbon-dioxide content of the exhaust gas, after oxidation of the unoxidized carbon bearing constituents thereof, a curve 81, as shown by A and B in Fig. 5, may be constructed and the scale values of the potentiometer dial face calibrated accordingly. Preferably this calibration should be periodically checked, as once a month. A value of 0.182 for the hydrogen-carbon ratio of the fuel has been found satisfactory but variation of 10 per cent has little effect on the calibration. This follows from the stoichiometric formula for the fuel-air ratio:

$$\frac{F}{A} = \frac{0.329 CO_2 \left(1 + \frac{H}{C}\right)}{100 - CO_2}$$

Attention is directed to the alternative circuits for switch 32 of the potentiometer in which are included resistors 72 and 73 of different ohmic resistance. By this means a range selection of fuel-air ratio corresponding respectively to 0.00 to 0.06 and 0.00 to 0.12 may be obtained in order to increase instrument sensitivity under certain conditions of use.

Outstandingly, the accuracy of the readings are noteworthy irrespective of conditions of use, a precision of 0.0025 fuel-air ratio being obtained. This is made possible by the following factors:

1. The oxidation of the exhaust gas is accomplished by a heated tube, thus removing the progressive drop inefficacy characteristic of the chemical oxidizer.

2. Complete oxidation of the oxidizable carbon elements is made possible by supplying and mixing an adequate volume of air with the fuel. Tests have indicated a 50–50 air-gas ratio as satisfactory.

3. Since the same air that balances the oxidized fuel in the bridge is combined with the fuel, uniformity in readings is assured for small variations in the ambient air temperatures and densities as well as composition. For large changes in temperature and densities, which would frequently occur when the instrument is used on aircraft, the use of a common mounting block 90 serves to make the meter indications independent of ambient pressure and temperature.

4. Continuous functioning of the apparatus insures immediate adaptation to surrounding atmospheric conditions.

While a specific disclosure is made to meet formal requirements, it is understood that variations in the detail of the apparatus may be made to meet various needs, the scope of the invention being circumscribed only as required by the claims hereto appended.

The invention described herein may be manufactured and used by or for the Government of the United States of America for governmental purposes without the payment of any royalties thereon or therefor.

What is claimed is:

1. Apparatus for indicating the fuel-air ratio of combustible gases supplied to an internal combustion engine comprising an electrical bridge circuit including at least two parallel branches, resistors in each branch, and measuring means for measuring potential changes in said resistors; a source of gas containing oxidizable carbon carrying substances; an air source; an oxidizer; a pump for mixing together air and gas from said sources in a predetermined ratio and for moving said air-gas mixture to said oxidizer for oxidation of said carbon carrying substances; a gas outlet; a first cell enclosing a resistor of one bridge branch; conduits connecting said air source to said first cell, said first cell to said pump and said gas source to said pump; second cell enclosing a resistor of another bridge branch; a discharge conduit from said pump having a single outlet connected to said oxidizer; a discharge conduit from said oxidizer having a single outlet connected to said second cell; and a conduit connected from said second cell to said gas outlet.

2. Apparatus for indicating the fuel-air ratio of combustible gases as defined in claim 1, with an air drier in said air conduit connecting the air source to said first cell, and a gas drier in said air-gas conduit connecting the oxidizer to said second cell.

References Cited in the file of this patent

UNITED STATES PATENTS

| | | |
|---|---|---|
| 1,681,047 | Porter | Aug. 14, 1928 |
| 2,013,998 | Goldsborough | Sept. 10, 1935 |
| 2,057,246 | Morgan et al. | Oct. 13, 1936 |
| 2,197,370 | Sullivan | Apr. 16, 1940 |
| 2,298,288 | Gerrish et al. | Oct. 13, 1942 |
| 2,399,965 | Weber | May 7, 1946 |
| 2,412,827 | Morgan et al. | Dec. 7, 1946 |
| 2,591,759 | Zaikowski | Apr. 8, 1952 |
| 2,633,737 | Richardson | Apr. 7, 1953 |

(Other references on following page)

FOREIGN PATENTS 373,239   Germany _____ Apr. 9, 1923

OTHER REFERENCES

Palmer et al.: "Thermal Conductivity Method for the Analysis of Gases," Technologic Papers of the Bureau of Standards No. 249 (part of vol. 18), pages 49–55, Jan. 7, 1924, pub. by Government Printing Office, Washington, D. C.

Daynes: "Gas Analysis by Measurement of Thermal Conductivity," pages 216, 217, pub. at the University Press, Cambridge, Great Britain (1933).